(12) United States Patent
Ham et al.

(10) Patent No.: US 8,130,245 B2
(45) Date of Patent: Mar. 6, 2012

(54) SYSTEM AND METHOD FOR PROCESSING MAP IMAGES

(75) Inventors: Todd E. Ham, Fairfax Station, VA (US); Kurt L. Feldbush, Melbourne, FL (US); Jason M. Asbell, West Melbourne, FL (US); Sean O. Miniclier, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 886 days.

(21) Appl. No.: 11/624,250

(22) Filed: Jan. 18, 2007

(65) Prior Publication Data

US 2008/0174593 A1     Jul. 24, 2008

(51) Int. Cl.
*G09G 5/00* (2006.01)

(52) U.S. Cl. ............ 345/660; 701/208; 340/995.15

(58) Field of Classification Search ............ None
See application file for complete search history.

(56) References Cited

U.S. PATENT DOCUMENTS

| | | | |
|---|---|---|---|
| 5,613,051 A | 3/1997 | Iodice et al. | 395/128 |
| 6,604,046 B1 | 8/2003 | Van Watermulen et al. | 701/208 |
| 6,690,491 B1 | 2/2004 | Kondo | 358/3.01 |
| 6,741,255 B1 | 5/2004 | Furlani et al. | 345/537 |
| 7,010,426 B1 | 3/2006 | Van Watermulen et al. | 701/208 |
| 7,343,268 B2 | 3/2008 | Kishikawa | 703/1 |
| 7,599,790 B2 * | 10/2009 | Rasmussen et al. | 701/208 |
| 2001/0032238 A1 | 10/2001 | Cronin, III et al. | 709/203 |
| 2002/0067374 A1* | 6/2002 | Kenyon | 345/764 |
| 2003/0158916 A1 | 8/2003 | Cronin, III et al. | 709/219 |
| 2004/0109197 A1 | 6/2004 | Gardaz et al. | 358/1.15 |
| 2004/0135784 A1 | 7/2004 | Cohen et al. | 345/501 |
| 2004/0217980 A1* | 11/2004 | Radburn et al. | 345/672 |
| 2005/0131962 A1 | 6/2005 | Deshpande | 707/201 |
| 2005/0270299 A1 | 12/2005 | Rasmussen et al. | 345/552 |
| 2005/0270305 A1* | 12/2005 | Rasmussen et al. | 345/613 |
| 2005/0270311 A1 | 12/2005 | Rasmussen et al. | 345/677 |

(Continued)

FOREIGN PATENT DOCUMENTS

EP     0967556     12/1999

(Continued)

OTHER PUBLICATIONS

Author: The Apache Jakara Project, Title: Overview, URL: http://web.archive.org/web/20061021233826/jakarta.apache.org/jcs/getting_started/intro.html.*

(Continued)

*Primary Examiner* — Andrew Wang
*Assistant Examiner* — David H Chu
(74) *Attorney, Agent, or Firm* — Allen, Dyer, Doppelt, Milbrath & Gilchrist, P.A.

(57) ABSTRACT

A system of processing map images includes a Web Mapping Service (WMS) for storing map images. A WMS proxy is operative with the WMS and receives from a client a request for a map image for display at the client. A WMS proxy includes a tile broker module that converts the request for the map image into a series of requests for obtaining map tiles. A cache system that stores the map tiles. The tile broker module is operative for returning cached map tiles if they already exist within the cache and retrieving map tiles from the WMS if map tiles are not returned from the cache. A tile building module is operative for building a map image at the WMS proxy from the map tiles in a requested format and resolution and displaying the map image at the client without resampling at the client.

21 Claims, 9 Drawing Sheets

U.S. PATENT DOCUMENTS

| | | | |
|---|---|---|---|
| 2006/0210196 A1 | 9/2006 | Wensley et al. | 382/305 |
| 2007/0118520 A1* | 5/2007 | Bliss et al. | 707/5 |
| 2007/0229524 A1* | 10/2007 | Hendrey et al. | 345/552 |
| 2008/0109159 A1* | 5/2008 | Shi et al. | 701/208 |

FOREIGN PATENT DOCUMENTS

| | | |
|---|---|---|
| FR | 2 788 398 | 7/2000 |
| TW | 565810 | 12/2003 |
| TW | 200517881 | 6/2005 |

OTHER PUBLICATIONS

Wang et al., "*A Load Balance Algorithm for WMS*," Geoscience and Remote Sensing Symposium, 2004, IEEE International, pp. 2920-2922.

Aloisio et al., "*A Grid-Enabled Web Map Server*," International Conference on Information Technology: Coding and Computing, 2005, 6 pages.

Schuyler et al., "*Proposal for a Distributed WMS Tile Cache*," Open Source Geospatial Conference / MapServer User Meeting 2005, 3 pages.

Doyle, "*WMS Extreme—Making WMS as Fast as Google Maps*,"Earth Observation and Geospatial Technology for Civil Society, 2005, 1 page.

Schuyler et al., "WMS Tile Caching," OSGEO.org article, 4 pages.

Rodriguez et al., "*Improving the WWW Caching or Multicast?*" Computer Networks and ISDN Systems, Nov. 25, 1998, pp. 2223-2243.

Tewari et al., "*Beyond Hierarchies: Design Considerations for Distributed Caching on the Internet*," Feb. 1, 1998, pp. 1-22.

\* cited by examiner

SYSTEM AND METHOD FOR PROCESSING MAP IMAGES

GOVERNMENT LICENSE RIGHTS

This invention was made with government support under Government Contract No. HM1571-04-A-0006 awarded by the National Geospatial-Intelligence Agency (NGA). The U.S. Government may have certain rights in the invention.

FIELD OF THE INVENTION

The present invention relates to the field of image processing, and more particularly, to systems and related methods of processing map images formed from map tiles used in mapping systems.

BACKGROUND OF THE INVENTION

Classical large image databases, such as those used by Google Earth and Microsoft Virtual Earth, require map data to be preprocessed. As a result, only one set of map data is served up with only one view into the map data. This limits the ability to rapidly make new map data available or to view map data from different perspectives, for example, viewing changing map data over time.

Current systems use a Web Mapping Service (WMS) with a WMS data layer that could include some cache system. In most systems, scalability and performance are enhanced by adding additional image services and using various load balancing techniques. For example, any users as clients could be connected by the internet to the WMS as one or more servers that could be load balanced with other WMS servers and a shared database such as a retrieval and information database. Performance can be enhanced by preprocessing imagery, trading currency of data for response time. Some systems have many tiles assembled at the client in which tiles are already predefined such that a client will fetch a tile, thus placing much work on the client with excessive map data processing occurring at the client.

SUMMARY OF THE INVENTION

A system of processing map images includes a Web Mapping Service (WMS) for storing map images. A WMS proxy is operative with the WMS and receives from a client a request for a map image for display at the client. A WMS proxy includes a tile broker module that converts the request for the map image into a series of requests for obtaining map tiles. A cache stores the map tiles. The tile broker module is operative for returning cached map tiles if they already exist within the cache and retrieving map tiles from the WMS if map tiles are not returned from the cache. A tile building module is operative for building a map image at the WMS proxy from the map tiles in a requested format and resolution and displaying the map image at the client without resampling at the client.

The WMS could be formed by a plurality of servers that store map images. A load balancing module could be operative with the WMS proxy and WMS for load balancing among the plurality of servers.

In yet another aspect, the WMS proxy is operative for storing map tiles within the cache that are retrieved from the WMS. The map building module is also operative for rebuilding a map image by mosaicking and cropping tiles. The map building module can be operative for building a tile specification that details an adjusted x, y position on overall mosaic and cropping parameters. The map building module can also be formed as hardware performance primitives, open GL/GPU or JAVA processes.

In yet another aspect, a distributed two-tier cache stores map tiles based on the Java Caching System (JCS), and other distributable caching mechanisms. A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

The system and method of processing map images formed from a plurality of tiles, in accordance with non-limiting examples of the present invention, overcomes disadvantages in prior art map imaging processes that use classical large image databases, such as Google Earth and Microsoft Virtual Earth, which require data to be preprocessed. In these systems, only one set of data is "served-up" with only one view into the data, limiting the ability of the system to make new data rapidly available or view data from different perspectives, for example, changing data over time. Some of the prior art mapping engines operative with a classic Web Map Service (WMS) were only marginally beneficial to solve analytical problems because of the inherent one state view of the world. Some improved map systems could process different spatial map tiles at the server that are fairly small. For example, a client would retrieve or "fetch" those map tiles that are necessary for the desired map screen, for example, tile number 3012. These systems could operate under Open GIS Consortium, which operates with an OGC WMS standard. This is the first interoperability standard in map serving space, but does not allow for rapid tiling. It is possible to request different scales of data at a different resolution and number of pixels, and the map server corresponding to the WMS would have responsibility for assembling that picture. This type of system takes some of the load off the clients. This type of system, however, can be slow if many users request a map, tying-up those processing resources used for making custom images. A positive benefit of such system, however, is the OGC specification, which allows querying over data ranges.

In accordance with non-limiting examples of the system and method of the present invention, clients now have the speed and open standard for use with a WMS interface, such that clients can remain lightweight with minimum processing, and do not require the extensive data processing on the map tiles. The system and method has the flexibility to continue querying through time and also maintain dynamic lightweight clients that can connect to the system.

Figure 1A:
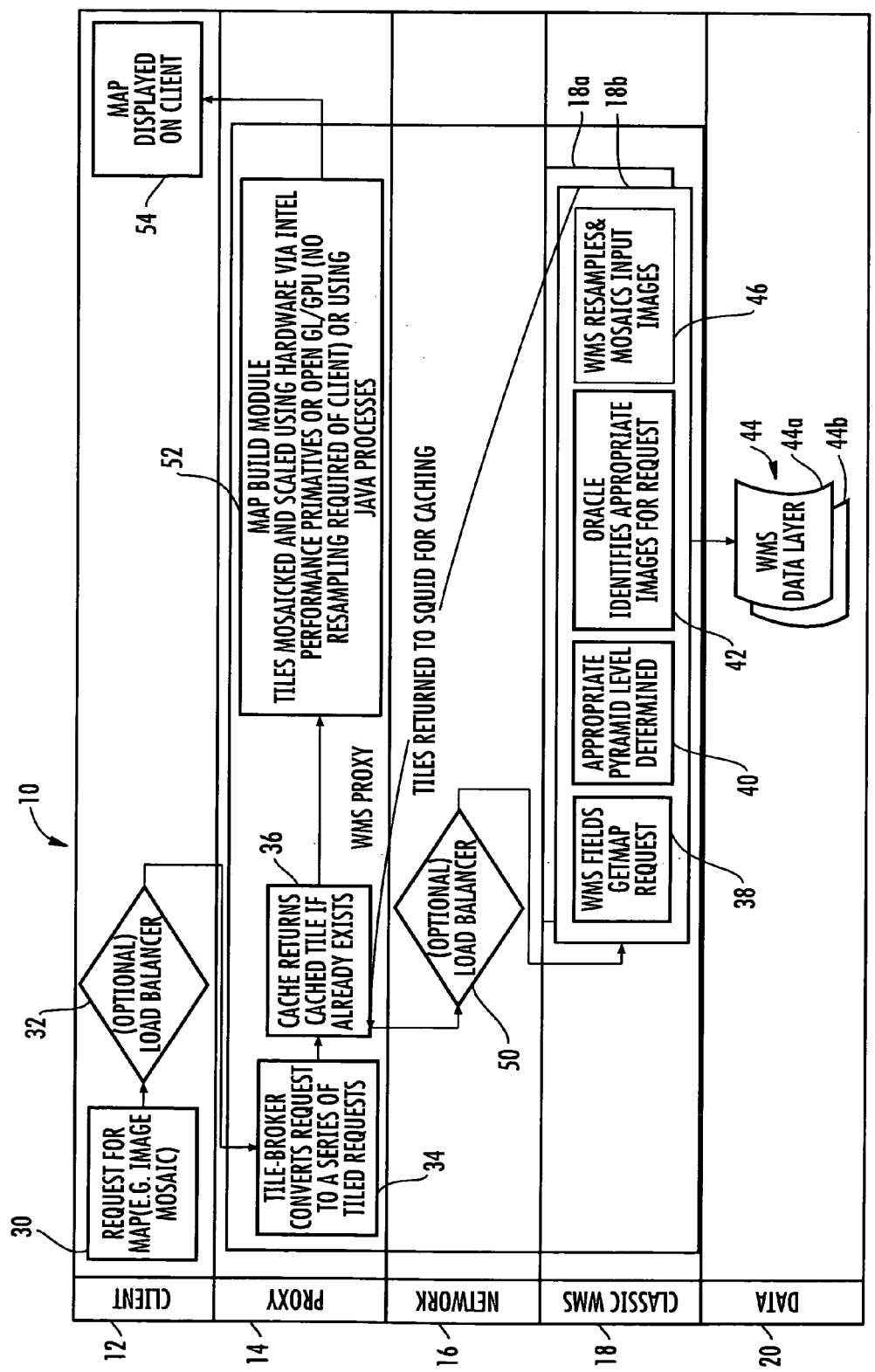
FIG. 1A is a block diagram showing basic components used in the system and method for processing map images using a WMS proxy in accordance with a non-limiting example of the present invention.

FIG. 1A is a block diagram of the system 10 in accordance with a non-limiting example of the present invention and shows five basic components or modules, including the client 12, the WMS proxy 14 as a tile broker and other components, the network module 16, the classic WMS 18 corresponding to one or more map servers, and the WMS data module 20 as a database for the WMS server. The classic WMS 18, network module 16 and WMS proxy 14 could be formed each as separate servers or as one server with different processing modules on the one server. Typically, the WMS proxy 14 is a separate server from any map servers forming the WMS. The WMS proxy 14 as a separate logic unit would preferably be a separate server from the network module and WMS server 18. It should be understood that the WMS proxy 14 as a separate server does not have to be connected to an internet. The WMS server 18 could also be formed from a number of separate servers or processors to allow load balancing via the network module that includes a load balancing module.

In operation, the client 12 requests a map such as an Image Mosaic 30. Load balancing 32 as an optional processing step can occur. At the WMS proxy 14, which acts as a separate logic module and typically a separate server, a tile broker 34 converts the map request to a series of tiled requests. A cache 36 returns the cached tile if it already exists, for example, by using an internet cache program such as SQUID or similar cache program.

The cache 36, for example, SQUID as a non-limiting example, typically will be a high performance proxy caching server for web clients that supports HTTP data objects and requests in single, non-blocking, input/output driven processes. Metadata and objects can be cached in RAM, including DNS look-ups and negative caching secure socket layer (SSL) extensive access controls and full requests logging are supported.

It should be understood that any internet object caching program and related cache can be used to store requested internet objects as data available via HTTP, FTP and gopher protocols as non-limiting examples. Web browsers can use the cache as a proxy HTTP server.

At the WMS server 18 as a typical separate server, the WMS fields the GetMap request 38 and the appropriate pyramid level is determined 40. A database access program identifies the appropriate images for request 42 into the WMS Data Layer 44 that could include several databases 44a, 44b. At this time, the WMS resamples and mosaics input images 46 with tiles returned to the cache 36 for caching. At the network module 16, an optional load balancing module 50 can occur. The WMS 18 can be formed by several servers 18a/18b as illustrated by the two large boxes depicting the servers, corresponding to a plurality of servers that could be load balanced.

The WMS proxy 14 is operative as a front-end proxy to the WMS 18. After the tiles are returned to the cache for caching, tiles are mosaicked and scaled at the map building module 52 as part of the WMS proxy 14, using software or hardware via the Intel Performance Perimatives or Open GL/GPU. No resampling is required of the client 12. It is possible and desirable in some embodiments to use a Java Caching System (JCS). The cache and map building module are operative together and can provide memory management, disk overflow and defragmentation, thread pool controls and element grouping. It is a composite cache for memory, disk, lateral and remote regions. It can have a memory cache with the Least Recently Used (LRU) algorithm for management. Cached data can be cached to multiple servers.

The Intel Performance Primitives provide multi-core power for multimedia and data processing as an appropriate software library of performance-optimized functions. In the alternative, the Open Graphics Library (Open GL) defines the cross-language, cross-platform application programming interface (API) for three-dimensional and two-dimensional computer graphics. Different functions can call and draw complex three-dimensional scenes from simple primitives.

After the tiles are cropped, mosaicked, and scaled, the map is displayed on the client 54. In this preferred embodiment, the WMS proxy 14, network 16 and WMS 18 are limited in management of the tile preparation on the server or servers. Temporary file clean up can be administered. Additionally, when fresh content is added, the cache for that area is flushed. This type of system provides for the potential of significant scalability. For example, if a particular image of a field is desired, such as 1,000 pixels wide and 1,000 pixels high, e.g., the size of a football field, the WMS proxy 14 could break that into predetermined tiles.

In this non-limiting example, perhaps four tiles are required in the original tiling. The system would break-up the data into four independent requests and determine if they exist already in cache. For example, images may have been pooled for some other reason in the past. The cache 36 is operative at this point. Perhaps the picture as a tile of the field was held at one-meter pixel resolution in the cache, and another tile was held at five meters pixel resolution, and yet another tile was held at 20 meters pixel resolution. In this example, perhaps the client 12 may desire a three-meter pixel resolution of the field. The four tiles would be processed and fetched out of the one-meter pixel resolution tile in cache. The map building module 52 would resample that down to three meters pixel resolution at a fast processing speed. Thus, in the system and method, different sizes can be fetched, and the resolution is highly changing for every user request. This tiling scheme, in accordance with non-limiting examples of the present invention, could hold in fixed resolution tiles of different scales, and resample them (down-sample) at lower scales quickly. For example, different libraries in the Intel Performance Perimitives could be used for the resampling.

In accordance with non-limiting examples of the present invention, the tile broker 34, combined with the cache 36 and the functional ability to resample those tiles and ship them back together at the right resolution, enhances the speed of operation in map imaging. The load balancing 32, 50 is operative if the WMS 18 includes a plurality of map servers 18a, 18b. For example, the WMS 18 shown in FIG. 1 illustrates two servers 18a, 18b, each as separate processors. As a result, the request for four tiles in the example above could be spread over the different processors. Load balancing helps populate the cache.

There now follows a more detailed description of the WMS proxy 14 that can be used in accordance with non-limiting examples of the present invention. The WMS proxy 14 is operatively similar to a reserve proxy for imagery. The WMS proxy 14 breaks an image request into common tiles, stores the common tiles in the fast-cache system 36, and builds the image from tiles in the format requested using the map building module 52 as a scaling module.

It is possible for the architecture to use two servlets, i.e., a front-end and a back-end, and include a cache connection and a concurrent threading system to control the number of requests to/from different proxy components.

Figure 1B:
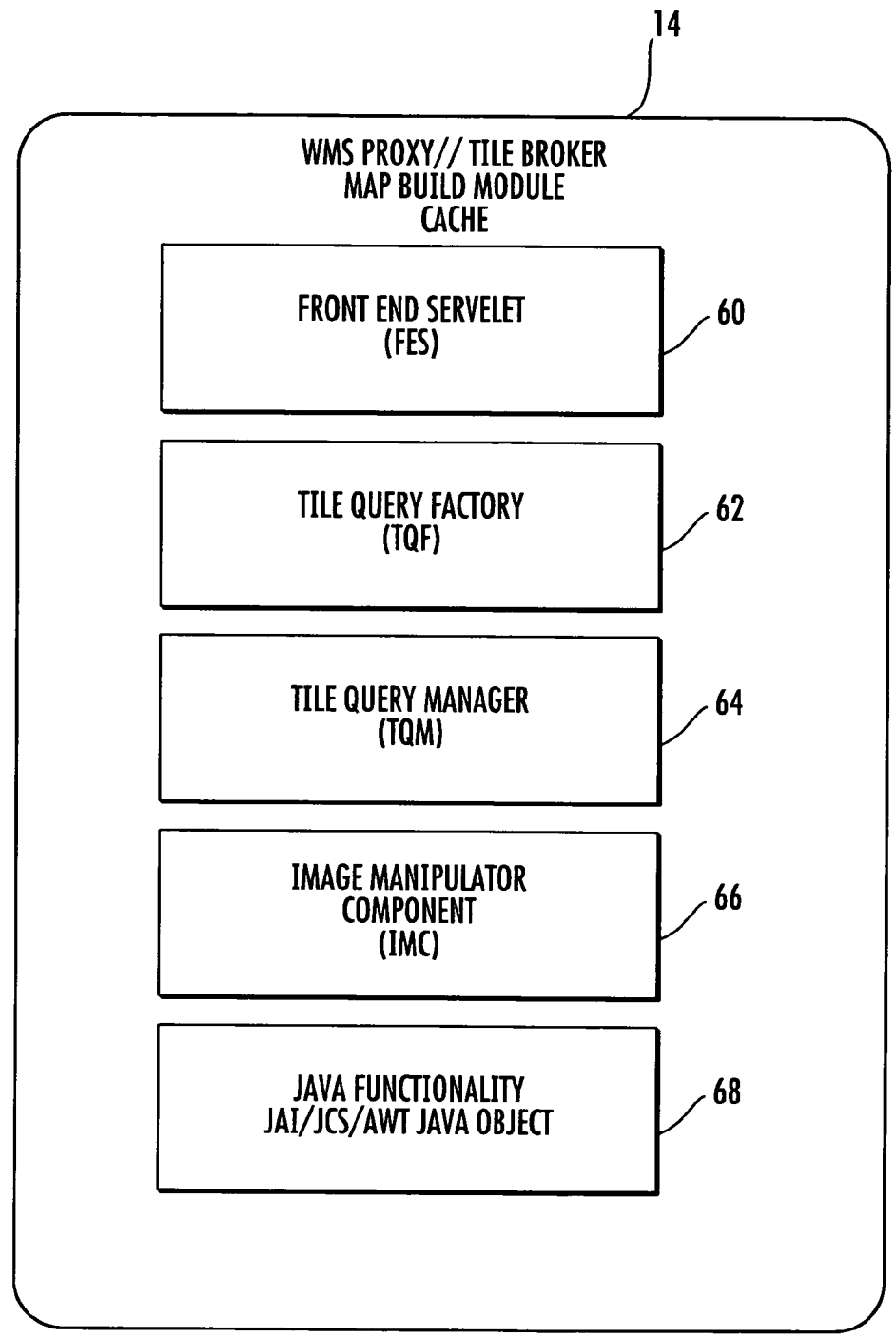
FIG. 1B is a more detailed block diagram of the WMS proxy and showing basic components.

Another embodiment splits the WMS proxy into a more patterned design such as shown in FIG. 1B. The major components of this embodiment could include a Front-End Servlet (FES) 60, the Tile Query Factory (TQF) 62, the Tile Query Manager (TQM) 64, and an ImageManipulator Component (IMC) 66. The configuration handling in this design is centralized. Java functionality 68 could include JAI and AWT Java objects, and the utilization of the JCS as an integrated and distributable cache.

The programming could allow configuration classes to be one instance across the system, allowing an accurate resolution level configuration. A resolution level adjustment, in one non-limiting example, could reduce memory overhead by as much as tenfold. In one embodiment, up to 48 individual 1000 by 1000 pixel tiles could be called to create an image that most efficiently could be handled by calling just four tiles. In dealing with AWT Java Objects, such as a buffered image, 48 individual 1000 by 1000 pixel tiles could cause a system failure due to a heap stack memory overload.

In another embodiment, the WMS proxy 14 calls a http-get command and runs as a servlet on the server, for example, an Apache-Tomcat server. Image tiles are added asynchronously to the tile mosaic and the TQM 64 retrieves the image tile when the thread has finished. The TQF 62 can build a tile specification detailing the adjusted X/Y position on the overall mosaic and crop parameters. It can return a reference list of any concurrent threads that may or may not have executed. The TQF 62 can submit a concurrent asynchronous thread. Another module, the Tile Retrieval Thread (TRT), can return the image tile result and will take the tile specification and use the IMC 66 to crop the tile using Java Advanced Imaging (JAI). It is also possible to operate with a SQUID (remote cache) thread pool and a WMS thread pool that are operative with a database. A Java Caching System (JCS) thread pool could be operative with the database.

The Front-End Servlet (FES) 60 as a WMS Proxy Servlet can be the starting point of the WMS Proxy. It can be coded as a Java Servlet (J2EE) and deployed through Apache Tomcat version 5.5.17, in one non-limiting example. The structure of this servlet can be described as "request in, process, response out." Though the FES 60 is one center point of the WMS Proxy, and holds the outline of the system, most of the true processing work is subjugated to other components. Below is an algorithm written in pseudo-code, detailing the FES request handling as a non-limiting example:

```
FrontEnd Begin
    WMSProxyParameters params <- parseWebVars( )
    Load RequestThreadPool pool
    Use TileQueryFactory to create TileQuery objects based on params
    Use TileQueryManager to load Tiles from TileQuery objects
    Get TileMosaic from TileQueryManager
    Use ImageManipulator to scale image based on params
    Open OutputStream to user
    Use Image Formatting I/O to send image in format based on params
    Close OutputStream
End FrontEnd
```

The Tile Query Factory (TQF) 62 produces Tile Query objects based on parameters loaded from the requested web environment variables. The TQF 62 is responsible for breaking down the overall query into its respective common tiles, and build a Tile Specification detailing the crop and mosaic positioning.

A Tile Specification calculation enforces a divide-and-conquer approach, which is taken in respect to the mosaicking process. Of course, different image integration operations could be processed, including overlay and mosaic as juxtaposing images as tiles in a presentation window, which could require scaling, cropping, color conversion and position registration. In cropping processes, the graphics processing function trims the necessary portions of the image. This approach also alleviates memory costs by monitoring only the needed portions of each tile active in processing. Below is an example of a representative algorithm, written in pseudo-code, detailing the TQF processes within the method Tile Query Factory::create Queries( );

```
TileQueryFactory::createQueries Begin
        Initialize List of Future Submissions (TileQuery) returnList
    // Assume the user/client parameters are loaded into the TQF
    WMSProxyParameters params
    // Get configuration from the system (e.g., Resolution Levels)
    WMSProxyConfig cfg <- get singleton proxy configuration
    // Determine DPP setting. Assuming DD Coordinates.
    RealNumber xDistance <- params.SEPoint.x – params.NWPoint.x
    RealNumber yDistance <- params.NWPoint.y – params.SEPoint.y
    RealNumber xDPP <- xDistance (DD) / params.requestWidth (Px)
    RealNumber yDPP <- yDistance (DD) / params.requestHeight (Px)
    // Get the resolution level for a given layer and dpp value.
    ResolutionLevel rlvl <- cfg.getResLvl (param.layer,
    min(XDPP,yDPP))
    RealNumber dpp <- rlvl.dpp
    // Adjust the start and end point for precision, this is used to
    // get the common tiles. Precision is currently 6 decimal points,
    // or IE6.
    Integer sx <- params.NWPoint.x * params.precision
    Integer sy <- params.NWPoint.y * params.precision
    Integer ex <- params.SEPoint.x * params.precision
    Integer ey <- params.SEPoint.y * params.precision
    Integer adjDPP <- dpp * params.precision
    // Calculate degrees covered per tile at this resolution level
    // Incorporate padding for tile overlay and mosaic 'stitching'.
    Integer ddPerTile <- cfg.tileSize * adjDPP
    Integer ddjDDPerPadding <- cfg.padding * adjDPP
    Integer ddPerFullTile <- ddPertile + 2 * adjDDPerPadding
    // Calculate the step increments (assumes tiles are square)
    Integer stepX <- ddPrerTile + adjDDPerPadding
    Integer stepY <- stepX
    // Determine the minimum and maximum points x and y that the
    // tiles will have to cover. The floor and ceiling of the points
    // divided by ddPerTile ensure a common tile.
    Integer minX <- floor(sx / ddPerTile) * ddPerTile;
```

```
Integer maxX <- ceiling(ex / ddPerTile) * ddPerTile;
Integer minY <- floor(sy / ddPerTile) * ddPerTile;
Integer maxY <- ceiling(ey / ddPerTile) * ddPerTile;
// Adjust the values for the padding on one side only.
minX <- minX – adjDDPerPadding
minY <- minY – adjDDPerPadding
maxX <- maxX – adjDDPerPadding
maxY <- maxY – adjDDPerPadding
// Calculate the raw image (tile mosaic) width and height
// before cropping would be done.
Integer width <- round(maxX – minX) / ddPerTile
Integer height <- round(maxY – minY) / ddPerTile
// Determine the crop values.
LongInteger ddLeftCrop <- (sx – minx) * cfg.tileSize
LongInteger ddTopCrop <- (maxY – ey) * cfg.tileSize
LongInteger ddRightCrop <- (maxX – ex) * cfg.tilesize
LongInteger ddBottomCrop <- (ey – winY) * cfg.tileSize
// Convert crop values to pixels
Integer leftTrim <- max(0, (ddLeftCrop / ddPerTile))
Integer topTrim <- max(0, (ddTopcrop / ddPerTile))
Integer rightTrim <- max(0, (ddRightCrop / ddPerTile))
Integer bottomTrim <- max(0, (ddBottowCrop / ddPerTile))
// Determine the cropped image size.
Integer croppedWidth <- width – leftTrim – rightTrim
Integer croppedHeight <- height – topTrim – bottomTrim
// Store these values in params for TQM, et al.
param.rawWidth <- croppedWidth
params.rawHeight <- croppedHeight
// declare the destination X position
Integer destX <- 0
// build and submit tile queries, determine the origin
Loop x <- minX to maxX by step stepX
    Integer originX <- cfg.padding
    Integer cropWidth <- cfg.tileSize
    If Tile is left and right tile (single tile case)
        originX <- leftTrim
        cropWidth <- cfg.tileSize – rightTrim – leftTrim – 2 *
            cfg.padding
    Else if Tile is left tile
        originX <- leftTrim
        cropWidth <- cfg.tilesize – leftTrim + cfg.padding
    Else if Tile is right tile
        originX <- cfg.padding
        cropWidth <- cfg.tileSize – rightTrim + cfg.padding
    End if
    // Declare the destination Y position
    Integer destY <- croppedHeight
    Loop y <- minY to maxY by step stepY
        Integer originY <- cfg.padding
        Intgeer cropHeight <- cfg.tilesize
        If Tile is top and bottom tile (single tile case)
            originY <- topTrim
            cropHeight <- cfg.tileSize – bottomTrim –
                topTrim + 2 * cfg.padding
        Else if Tile is top tile
            originY <- topTrim
            cropHeight <- cfg.tileSize – topTrim + cfg.padding
        Else if Tile is bottom tile
            cropHeight <- tileSize – bottomTrim + cfg.padding
        End if
        // Adjust the location on the Y axis
        destY <- destY – cropHeight
        // Initialize a new tile specification
        Initialize TileSpec spec
        spec.cropHeight <- cropHeight
        spec.cropWidth <- cropWidth
        spec.originX <- originX
        spec.originY <- originY
        spec.destX <- destX
        spec.destY <- destY
        spec.tileSize <- cfg.tileSize
        spec.padding <- cfg.padding
        // Create a bounding box based on the x/y settings of loop
        RealNumber north <- x / cfg.precision
        RealNumber west <- y / cfg.precision
        RealNumber south <- x + ddPerFullTile / cfg.precision
        RealNumber east <- y + ddPerFullTile / cfg.precision
        // Append bounding box numbers in correct format to url
        String url <- params.url + bbox(north,west,south,east)
        Build new Tile Query thread with above parameters
        returnList.add(reference to new thread submission)
    End loop y
End Loop x
Return the returnList
End TQF TileQueryFactory::createQueries
```

Figure 2:
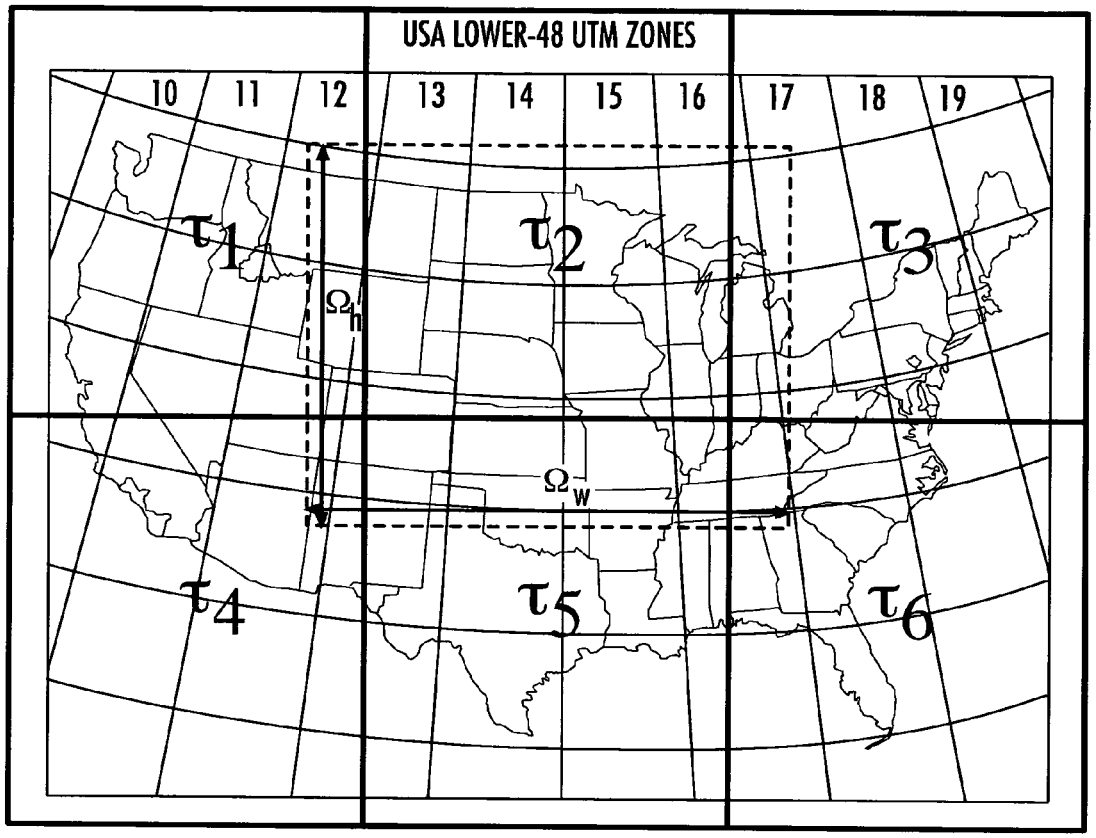
FIG. 2 is a map image showing an approach to tile cropping to determine the tiles and request imagery in accordance with a non-limiting example of the present invention.

FIG. 2 is a map image divided into a grid pattern (array) and showing a divide-and-conquer approach to tile cropping (prior to addition to mosaic) to determine the tiles and request imagery.

In this map image, the dashed rectangular block in the middle represents the requested query area. $\tau_n$ represents the common tile at a given resolution level. $\Omega w$ represents the raw composite (mosaic) width. $\Omega h$ represents the raw composite (mosaic) height.

Figure 3:
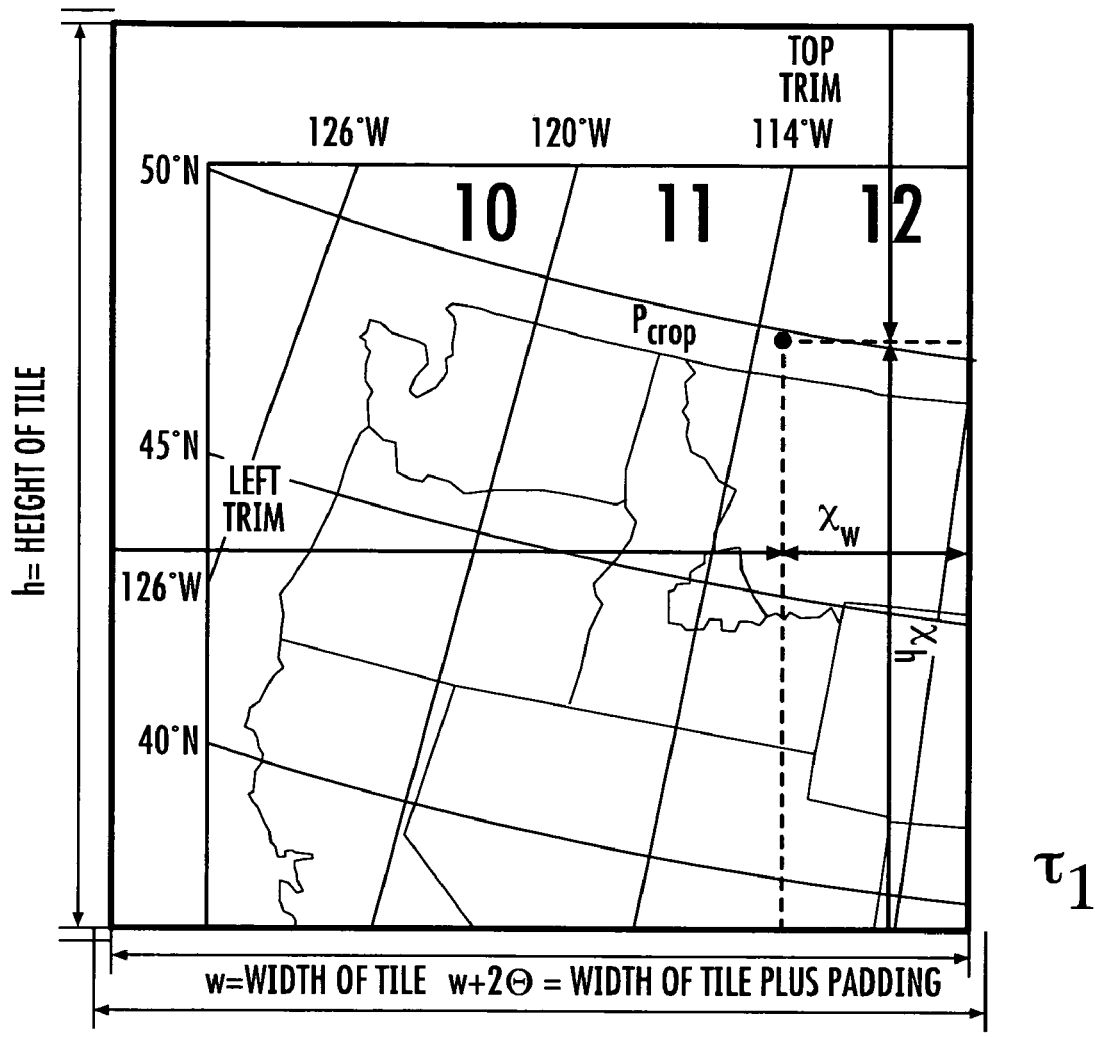
FIG. 3 is a map image showing an approach to tile cropping to determine the crop and mosaic-position parameters in which the algorithm starts with tile one in accordance with a non-limiting example of the present invention.

FIG. 3 is a map image divided into a grid pattern and showing the divide-and-conquer approach to tile cropping (prior to addition to mosaic) to determine the crop and mosaic position parameters. The algorithm starts with tile 1 (minX and minY).

Figure 4:
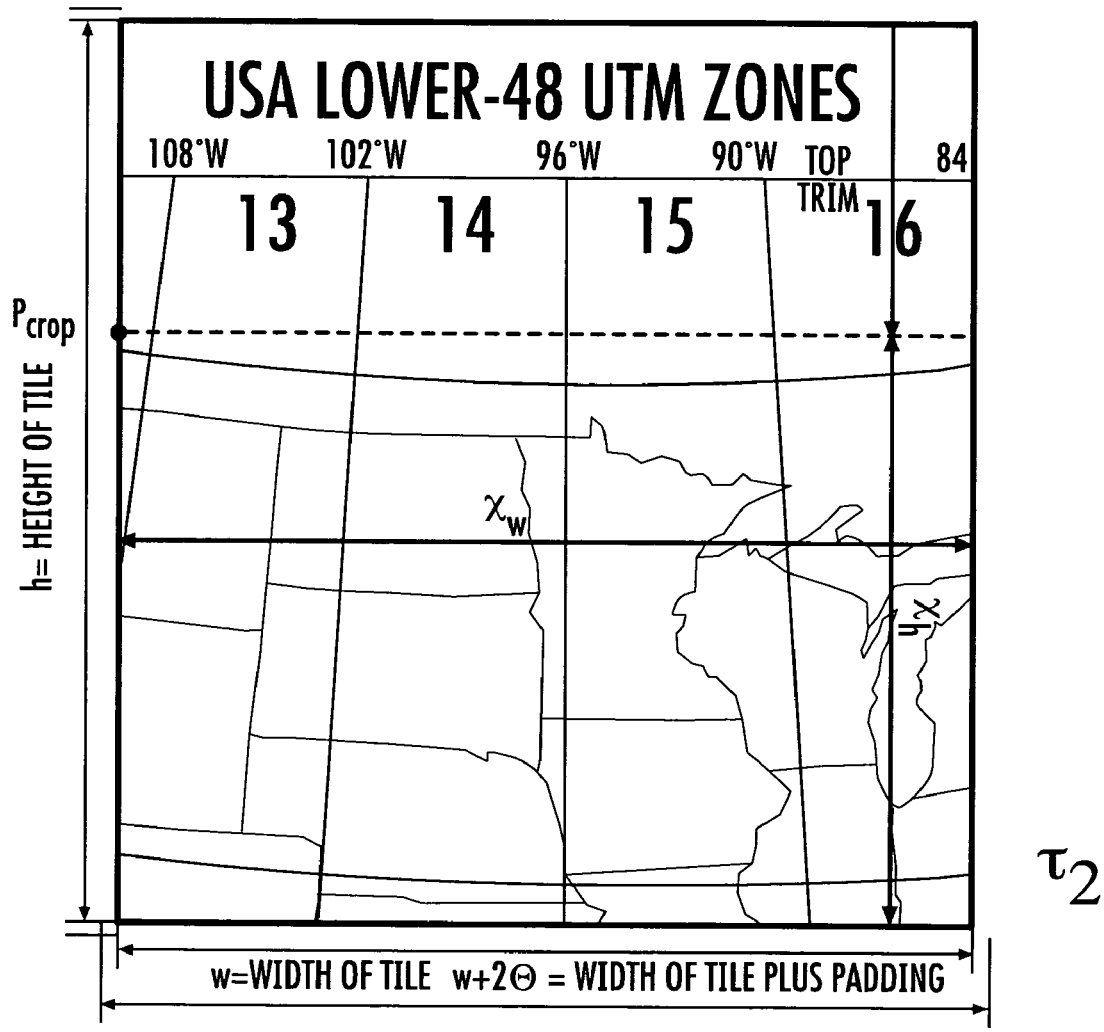
FIG. 4 is a map image showing an approach to tile cropping to determine the crop and mosaic-position parameters in which the algorithm continues with tile two following the X axis before the Y axis in accordance with a non-limiting example of the present invention.

In this map image, the implicit variables are Tile X position=0, Tile Y Position=0. The constants are Tile Size (W and H) and Padding ($\theta$). The Tile Specification for Tile 1 ($\tau_1$) is:

o.x$\tau_1$: Crop Origin X for Tile 1=$P_{crop}.x$
o.y$\tau_1$: Crop Origin Y for Tile 1=$P_{crop}.y$
$\delta$.x$\tau_1$: Destination X for Tile 1=0
$\delta$.y$\tau_1$: Destination Y for Tile 1=0
$\chi$.w$\tau_1$: Crop Width for Tile 1=w+2$\theta$–$P_{crop}.x$
$\chi$.h$\tau_1$: Crop Height for Tile 1=h+2$\theta$–$P_{crop}.y$ FIG. 4 is a map image divided into a grid pattern and showing the divide-and-conquer approach to tile cropping (prior to addition to mosaic) to determine the crop and mosaic position parameters. The algorithm continues with tile 2 following the X-axis before the Y-axis.

Figure 5:
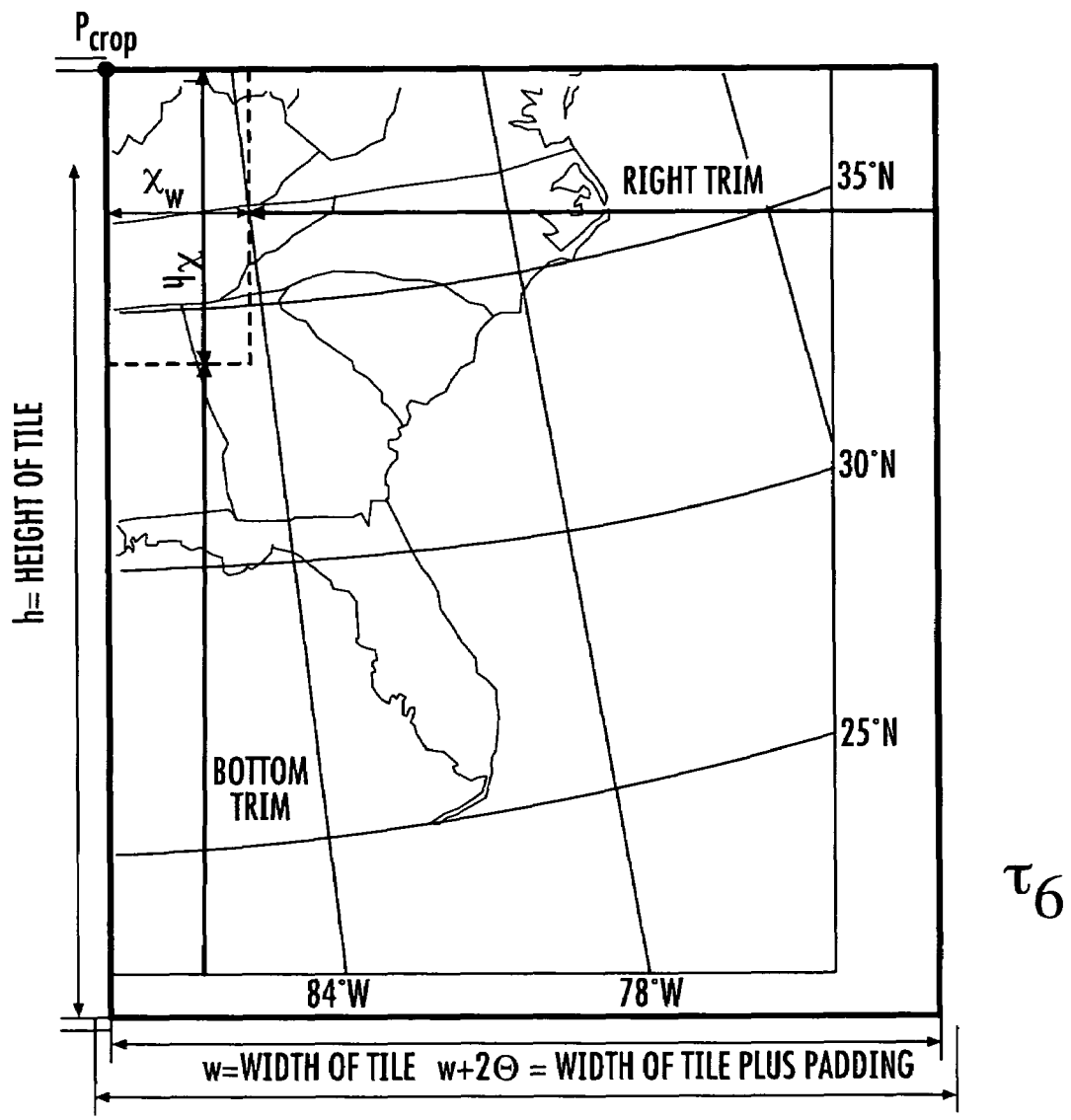
FIG. 5 is a map image showing an approach to tile cropping to determine the crop and mosaic-position parameters in which the algorithm would finish with tile six corresponding to the lower right tile in accordance with a non-limiting example of the present invention.

In this map array, the implicit variables are Tile X Position=1 and Tile Y Position=0. The constants are Tile Size (W and H) and Padding ($\theta$). The Tile Specification for Tile 2 ($\tau_2$) is:

o.x$\tau_2$: Crop Origin X for Tile 2=$P_{crop}.x$
o.y$\tau_2$: Crop Origin Y for Tile 2=$P_{crop}.y$
$\delta$.x$\tau_2$: Destination X for Tile 1=$\chi$.w$\tau_1$
$\delta$.y$\tau_1$: Destination Y for Tile 1=$\chi$.h$\tau_1$
$\chi$.w$\tau_1$: Crop Width for Tile 1=w+2$\theta$–$P_{crop}.x$
$\chi$.h$\tau_1$: Crop Height for Tile 1=h+2$\theta$–$P_{crop}.y$ FIG. 5 is a map image divided into a grid pattern and showing the divide-and-conquer approach to tile cropping (prior to addition to mosaic) to determine the crop and mosaic position parameters. The algorithm will finish with tile 6 as the lower right tile.

In this map image, the implicit variables are Tile X Position=2 and Tile Y Position=1. The constants are Tile Size (W and H) and Padding ($\theta$). The Tile Specification for Tile 6 ($\tau_6$) is:

o.x$\tau_6$: Crop Origin X for Tile 6=$P_{crop}.x$
o.y$\tau_6$: Crop Origin Y for Tile 6=$P_{crop}.y$
$\delta$.x$\tau_6$: Destination X for Tile 6=$\Omega_w$–RIGHT TRIM
$\delta$.y$\tau_6$: Destination Y for Tile 6=$\Omega h$–BOTTOM TRIM
$\chi$.w$\tau_6$: Crop Width for Tile 6=w+2$\theta$–RIGHT TRIM
$\chi$.h$\tau_6$: Crop Height for Tile 6=w+2$\theta$–BOTTOM TRIM The Tile Query Manager (TQM) 64 of the WMS Proxy is responsible for putting the tile query results together into a single Tile Mosaic. The TQM 64 is initialized with a list of references to currently executing queries. It will monitor the queries through grouped asynchronous threads, and will wait until the Tile Mosaic has been built before returning it to the caller. The diagram shown in FIG. 6 shows how the TQM spawns and waits for the tiles to be retrieved.

Figure 6:
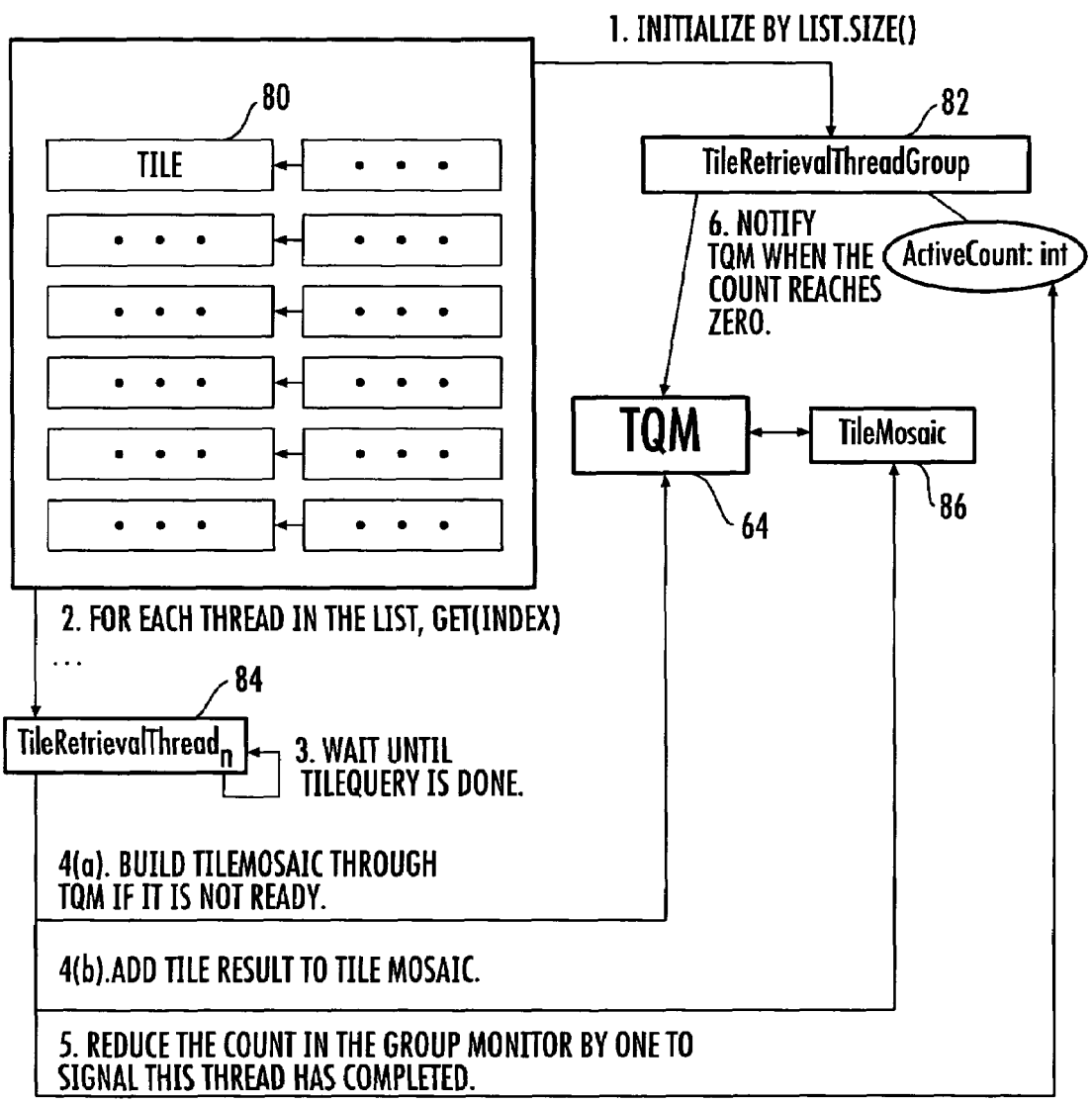
FIG. 6 is a block diagram showing a flow sequence in the operation of the Tile Query Manager component of the WMS proxy in accordance with a non-limiting example of the present invention.

As shown in FIG. 6, the system includes various map tiles 80 and is initialized at step 1 with the Tile Retrieval Thread Group 82. For each thread in the list as shown at step 2, the TileRetrievalThread 84 operates. The process waits until the TileQuery is done as a step 3 in the process. The TileMosaic is built through TQM if it is not ready (i.e., not initialized) using the first available query information from a finished Tile Retrieval Thread (step 4a), and is operative with the TQM 64 and the TileMosaic 86. The Tile Result is added to the TileMosaic (step 4b) and the count in the group monitor is reduced by one to signal that the thread has completed in step 5. The TQM 64 is notified when the count reaches zero as a step 6.

The Image Manipulator Component (IMC) 66 (FIG. 1B) is, typically, a utility class. The IMC 66 is used to perform image processing functions. The IMC can use the Intel® Integrated Performance Primatives (IPP) library for image processing. The IPP, though efficient image processing, may have a relatively high overhead due to Java Native Invocation (JNI), as a Java-to-C++ (et al.) bridge, designed to allow Java applications to access non-Java libraries and code.

The removal of a JNI bridge occurs when IPP is no longer used.

The WMS Proxy 14 uses the IMC 66 for scaling and cropping functions. Image conversion and analysis are all available within the extensible framework of JAI. For scaling and cropping, as well as image holding, the architecture backs away from Java's Abstract Window Toolkit (AWT) objects, such as BufferedImage, which follow the "push" model of image processing. Images are always loaded completely to memory before any processing commands are available. Instead of AWT, the baseline can use the RenderedImage interface of Java's Graphics2D™/JAI framework.

The RenderedImage interface (and related objects RenderedOp/RenderableOp) follows the "pull" model of image processing. In this model, image processing commands are available at any time. Ideally, any processing commands for an image are added to a directed acyclic graph (DAG) before the image is loaded to memory. This approach permits efficient use of memory space, without the gluttony of many image objects needlessly remaining in scope.

Below is an example of the code used by the IMC 66 to crop images, as a non-limiting example. The ParameterBlock is a holder object, much like a list. The correct usage of this class is solely dependant on the JAI operation on which the block will be called:

```
public static RenderedOp cropImage (RenderedOp img, TileSpec spec)
{
    // Create the parameter block used to crop.
    ParameterBlock pb = new ParameterBlock( );
    pb.addSource (img);
    pb.add((float)spec.theCropOriginX);
    pb.add((float)spec.theCropOriginY);
    pb.add((float)spec.theCropWidth);
    pb.add((float)spec.theCropHeight);
    // Create a rendered operation from the crop parameters.
    return JAI.create ("crop", pb, null);
}
```

Below is an example of the code used by the IMC 66 to scale images. There is some similarity between the way the crop operation is called, and the way the scale operation is called. The ParameterBlock of the scale operation contains different settings (in count, and object class) than that of the crop operation:

```
// Note that TileMosaic is an extension of the RenderedOp class.
public static TiledImage scaleImage(TileMosaic rawImage,
                                     WMSProxyParameters parameters)
{
    // Determine the scale
    float scaleX = (float)parameters.getRequestedWidth( ) /
        (float) rawImage.getWidth( );
    float scaleY = (float)parameters.getRequestedHeight( ) /
        (float) rawImage.getHeight ( );
    // Create the parameter block for scaling.
    ParameterBlock pb = new ParameterBlock( );
    pb.addSource (rawImage);
    pb.add(scaleX);
    pb.add(scaleY);
    pb.add(0F);
    pb.add(0F);
    pb.add(Interpolation.getInstance(Interpolation.INTERP_BICUBIC_2));
    return new TiledImage(JAI.create("scale", pb), true);
}
```

Figure 7:
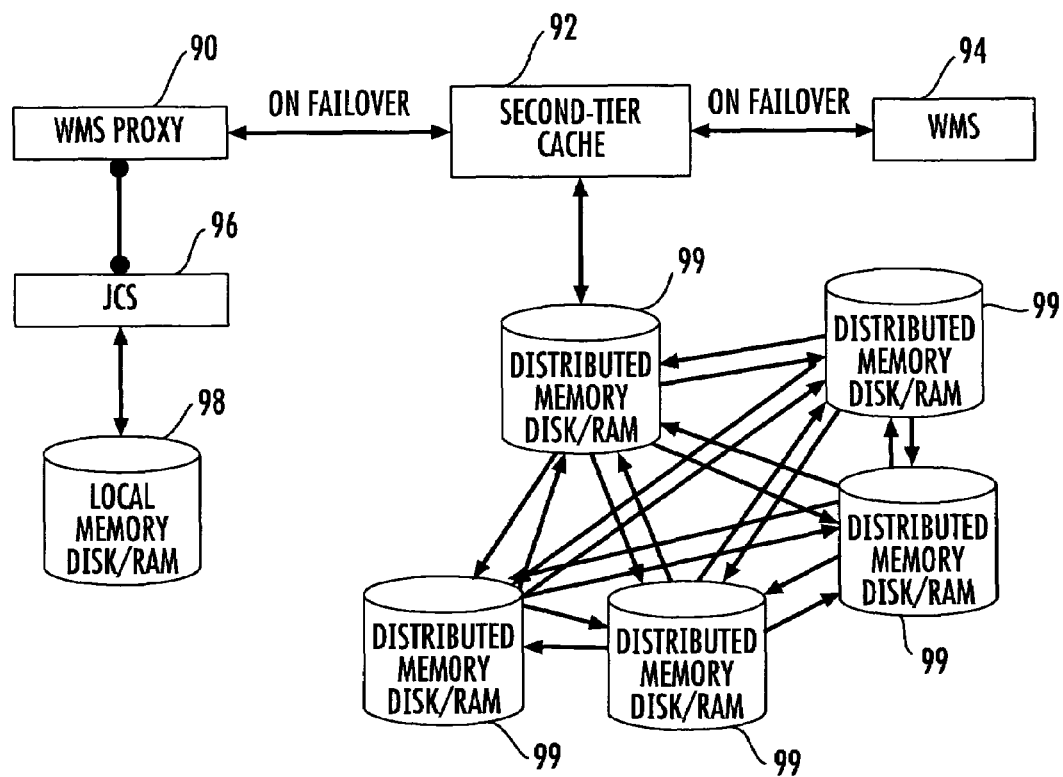
FIG. 7 is a block diagram showing a two-tier cache that can be used in accordance with a non-limiting example of the present invention.

Two-tier caching as part of the WMS proxy 14 is available as shown in the system block diagram of FIG. 7. One embodiment of the WMS Proxy architecture has the caching of image tiles located near the WMS Proxy. Active recent "hot" image tiles could be available through the cache at a speed much faster than going directly to the related WMS system. However, in the best case, an http network call could be involved in the overall cost of image tile retrieval. It is desirable to control and delete individual image tiles that reside in the cache. The entire cache could be deleted, yet this broad approach is not sufficient control of "hot" imagery.

The Java Caching System (JCS) is a distributed caching system written in Java by the Apache Jakarta project. Because it is written in Java, and because it is not a true stand-alone cache web application, the JCS could be implemented within the WMS Proxy 14, removing the http network call altogether.

The JCS could be implemented as an integrated cache providing near-zero access overhead to image tiles. JCS also provides complete control over every image tile that resides within it. The WMS Proxy cache could be between 1 GB and 100 GB in size, or even larger, and implemented in a Disk-Caching mode. With a very large cache disk allocation, and a large amount of users accessing cached data (e.g., the N-scale scenario, or high user-load case), it is very likely that the disk would be overloaded with access requests to disk objects. This not only would strain the JCS cache, but sub-sequentially, the WMS Proxy would suffer as well.

The http network call to a distributable cache application can actually be a benefit. Thus, a two-tier caching architecture is implemented into the WMS Proxy in one non-limiting example shown in FIG. 7.

A local integrated cache (JCS) is added to the WMS Proxy. The JCS would be tuned to best performance, in terms of disk space allocation to overall system cost. A failover cache would be distributed, as per the original design, to a separate caching application. This separate caching application would be the larger of the two tiers of caching. Also, because the utilized caching software, e.g., JCS, SQUID, et al., is laterally distributable (able to have sub-caches on other machines), the second-tier becomes plausibly scalable to fit any N-scale requirement.

Therefore, the integrated JCS becomes the "hot" image tile repository, the second-tier cache (currently SQUID, but could be JCS) becomes the "warm" image tile repository, and the backend will continue to exist in case of dual failover, as intented design for new image tile retrieval and cache storage.

FIG. 7 is a block diagram showing an example of a two-tier caching approach using reference numerals in the 90 series, As illustrated, the WMS proxy 90 is operative with a second-tier cache 92 on "failover" and the WMS 94 on "failover." The WMS proxy 90 is operative with the JCS 96 and a local memory 98 such as disk RAM. The second-tier cache 92 is operative with distributed memory 99 such as a disk/RAM, which in turn, is operative with other distributed memories 99.

Figure 8:
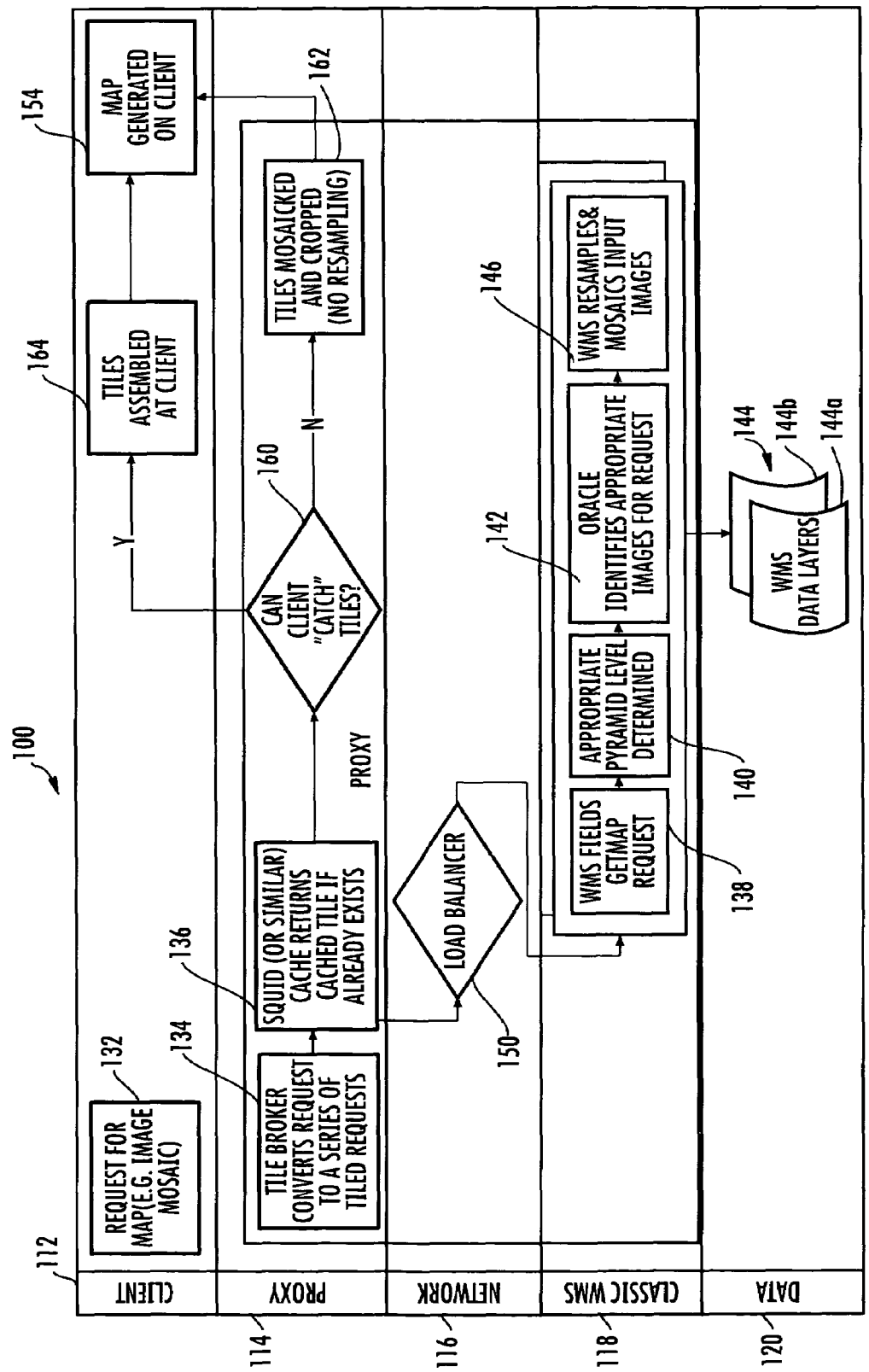
FIG. 8 is a block diagram of another embodiment similar to the system shown in FIG. 1A showing basic components used for processing map images that can be used in accordance with a non-limiting example of the present invention.

Referring now to FIG. 8, there is illustrated another embodiment in which the system is limited in management of the tile preparation on the server. Numbers begin in the 100 series. Those components and modules that are similar in function to the components and modules in the system shown in FIG. 1A are given common reference numerals beginning in the 100 series.

The system is illustrated at 100 and includes many of the basic components as set forth in the system shown in FIG. 1A. Temporary file clean-up is administered and when fresh content is added to the WMS 118, the cache is flushed. This WMS implementation provides for the potential of significant scalability. The five basic components of the client 112, WMS proxy 114, network 116, classic WMS 118 and data 120 are illustrated. What differs from the preferred system of FIG. 1A is that a determination is made if the client can "catch" the tiles 160. If not, the tiles are mosaicked and cropped with no resampling 162 and the map generated on the client 154. If yes, the tiles are assembled at the client 164 and a map generated on the client 154. The network option with the optional load balancer 150 remains the same with the classic WMS 118 and data 120 the same. Of course, tiles are returned to the cache 136 for caching.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system of processing map images, comprising:
   a Web Mapping Service (WMS) for storing map images; and
   a WMS proxy operative with the WMS that receives from a client a request for a map image for display at the client, said WMS proxy further comprising
   a distributed two-tier cache that stores map tiles,
   a tile broker module that converts the request for the map image into a series of requests for obtaining map tiles, wherein said tile broker module is operative for returning cached map tiles if they already exist within the cache and retrieving map tiles from the WMS if map tiles are not returned from the cache; and
   a tile building module operative for building a map image at the WMS proxy from the map tiles in a requested format and resolution and displaying the map image at the client without resampling at the client, wherein the tile building module is configured to resample each map tile into a requested tile format and at a requested tile resolution before building the map image from the map tiles.

2. A system according to claim 1, which further comprises a plurality of servers on which said WMS stores map images, and further comprising a load balancing module operative with said WMS proxy and WMS for load balancing among the plurality of servers.

3. A system according to claim 1, wherein said WMS proxy is operative for storing map tiles within said cache that are retrieved from the WMS.

4. A system according to claim 1, wherein said tile building module is operative for rebuilding a map image by cropping, mosaicking, and scaling tiles.

5. A system according to claim 4, wherein said tile building module is operative for building a tile specification for an individual tile that details an adjusted x,y position using a crop origin position and a destination position, and crop width and height for overall mosaic and cropping parameters.

6. A system according to claim 1, wherein said tile building module comprises hardware performance primitives, Open GL/GPU or JAVA processes.

7. A system of processing map images, comprising:
   a Web Mapping Service (WMS) for storing map images; and
   a WMS proxy operative with the WMS that receives from a client a request for a map image for display at the client, said WMS proxy further comprising
   a distributed two-tier cache that stores map tiles based on the Java Caching System (JCS),
   a tile broker module that converts the request for the map image into a series of requests for obtaining map tiles, wherein said tile broker module is operative for returning cached map tiles if they already exist within the cache and retrieving map tiles from the WMS if map tiles are not returned from the cache; and
   a tile building module that is operative for building a map image at the WMS proxy from the map tiles in a requested format and resolution and displaying the map image at the client without resampling at the client, wherein the tile building module is configured to resample each map tile into a requested tile format and at a requested tile resolution before building the map image from the map tiles.

8. A system according to claim 7, which further comprises a plurality of servers on which said WMS stores map images, and further comprising a load balancing module operative with said WMS proxy and WMS for load balancing among the plurality of servers.

9. A system according to claim 7, wherein said WMS proxy is operative for storing map tiles within said two-tier cache that are retrieved from the WMS.

10. A system according to claim 7, wherein said map building module is operative for rebuilding a map image by cropping, mosaicking, and scaling tiles.

11. A system according to claim 10, which further comprises a tile specification for an individual tile that details an adjusted x,y position using a crop origin position and a destination position, and crop width and height for overall mosaic and cropping parameters.

12. A system according to claim 7, wherein said map building module comprises hardware performance primitives, Open GL/GPU or JAVA processes.

13. A method of processing map images, comprising:
   receiving at a Web Mapping Service (WMS) proxy from a client a request for a map image for display at the client;
   converting the request for the map image into a series of requests for obtaining map tiles;
   storing map tiles within a distributed two-tier cache;
   returning cached map tiles if they already exist within a cache and from a Web Mapping Service (WMS) if the map tiles do not exist within the cache;

building a map image at the WMS proxy from the map tiles in a requested format and resolution;

displaying the map image at the client without resampling at the client; and resampling each map tile into a requested tile format and at a requested tile resolution before building the map image from the map tiles.

14. A method according to claim 13, wherein the step of building a map image comprises cropping, mosaicking, and scaling tiles.

15. A method according to claim 14, which further comprises mosaicking and cropping tiles using performance primitives, an OpenGL/GPU or JAVA processes.

16. A method according to claim 13, which further comprises storing map tiles retrieved from the WMS within the cache.

17. A method according to claim 13, which further comprises storing map images on a plurality of servers at the WMS and load balancing among the plurality of servers.

18. A method according to claim 13, which further comprises building a tile specification for an individual tile that details an adjusted x,y position using a crop origin position and a destination position, and crop width and height for overall mosaic and cropping parameters.

19. A method according to claim 13, which further comprises creating tile query objects from the request for a map image.

20. A method according to claim 19, which further comprises placing results from any query objects into a tile mosaic.

21. A method according to claim 13, which further comprises breaking down the request from the client into a request for respective common tiles and building a specification detailing any crop and mosaic positioning.

* * * * *